United States Patent
Paradise et al.

(10) Patent No.: US 7,289,538 B1
(45) Date of Patent: Oct. 30, 2007

(54) CLOCK RECONSTRUCTION FOR TIME DIVISION MULTIPLEXED TRAFFIC TRANSPORTED OVER ASYNCHRONOUS ETHERNET NETWORKS

(75) Inventors: On Paradise, Tel Aviv (IL); Amir Lahat, Sunnyvale, CA (US); Zvika Bronstein, Ramat Efal (IL); Pavel Hardak, Lod (IL); Gila Klein, Rosh Ha'ain (IL)

(73) Assignee: Atrica Israel Ltd., Herzelia (IL)

( * ) Notice: Subject to any disclaimer, the term of this patent is extended or adjusted under 35 U.S.C. 154(b) by 1038 days.

(21) Appl. No.: 10/218,284

(22) Filed: Aug. 14, 2002

Related U.S. Application Data (60) Provisional application No. 60/312,520, filed on Aug. 14, 2001.

(51) Int. Cl.
  *H04J 1/02* (2006.01)
(52) U.S. Cl. ...................... 370/497; 370/518
(58) Field of Classification Search ................ 370/235, 370/358, 389, 391, 392, 394, 395.1, 395.62, 370/497, 503, 509, 510, 512, 516, 518
See application file for complete search history.

(56) References Cited

U.S. PATENT DOCUMENTS

| | | | |
|---|---|---|---|
| 5,982,828 A * | 11/1999 | Fujimori et al. ............ 375/356 |
| 6,163,861 A * | 12/2000 | Yoshioka et al. ........... 714/712 |
| 6,172,964 B1 | 1/2001 | Whitton | |
| 6,377,579 B1 | 4/2002 | Ofek | |
| 6,480,511 B1 | 11/2002 | Petty | |
| 6,493,831 B1 * | 12/2002 | Saitoh ........................ 713/502 |
| 6,570,890 B1 * | 5/2003 | Keenan et al. .............. 370/493 |
| 6,574,246 B1 * | 6/2003 | Crosby ....................... 370/516 |

OTHER PUBLICATIONS

U.S. Appl. No. 09/738,597, filed Dec. 14, 2000, Lahat.

* cited by examiner

*Primary Examiner*—Brenda Pham
(74) *Attorney, Agent, or Firm*—Howard Zaretsky; Zaretsky & Associates PC (57) ABSTRACT

A clock reconstruction mechanism for synchronous TDM communications traffic transported over asynchronous networks such as Ethernet networks. The invention is applicable to edge switches in Metropolitan Area Networks (MANs) that transport legacy TDM traffic using a Circuit Emulation Services (CES) module whereby TDM traffic is encapsulated and transported across the Ethernet network where it is de-encapsulated and clocked out to the destination. The mechanism encapsulates the input TDM data stream into Ethernet packets and inserts a network timestamp within the packet. At the destination CES, a local timestamp is generated for each received packet as it is received. The network timestamp is extracted and input along with the local timestamp to a Digital Time Locked Loop (DTLL) which is operative to accurately reconstruct the original transmit TDM clock. The filter in the DTLL performs a Least Squares Regression (LSR) algorithm and Infinite Impulse Response (IIR) filter algorithm to generate a clock control signal for adjusting the clock generated.

37 Claims, 9 Drawing Sheets

CLOCK RECONSTRUCTION FOR TIME DIVISION MULTIPLEXED TRAFFIC TRANSPORTED OVER ASYNCHRONOUS ETHERNET NETWORKS

REFERENCE TO RELATED APPLICATIONS

This application is based on U.S. Provisional Application Ser. No. 60/312,520 filed Aug. 14, 2001, entitled "Clock Synchronization Mechanism In A Time Division Multiplexing Circuit Emulation Services," incorporated herein by reference in its entirety. This application is related to U.S. application Ser. No. 09/738,597 filed Dec. 14, 2000, entitled "Facility For Transporting TDM Streams Over An Asynchronous Ethernet Network Using Internet Protocol," now U.S. Pat. No. 6,963,561 incorporated herein by reference in its entirety.

FIELD OF THE INVENTION

The present invention relates to the field of data communications and more particularly relates to a clock reconstruction mechanism for synchronous TDM communications traffic transported over asynchronous Ethernet networks.

BACKGROUND OF THE INVENTION

The growth in demand for telecommunication services is increasing at an ever-quickening pace. The majority of the demand is being driven by the explosion in the use of the Internet and a steady stream of new applications being introduced which further increase the demand for increased bandwidth. Currently, a large portion of the Internet traffic is still carried by circuit switched transport facilities. In the case of Metropolitan Area Networks (MANs), most of the traffic is transported over SONET/SDH based networks most of which were originally resigned for voice traffic. With time, more and more customers are using the networks for transporting data rather than voice.

The requirements for networked communications within the user community have changed dramatically over the past two decades. Several notable trends in the user community include (1) the overwhelming domination of Ethernet as the core networking media around the world; (2) the steady shift towards data-oriented communications and applications; and (3) the rapid growth of mixed-media applications. Such applications include everything from integrated voice/data/video communications to the now commonplace exchanges of MP3 music files and also existing voice communications which have begun to migrate towards IP/packet-oriented transport.

Ethernet has become the de facto standard for data-oriented networking within the user community. This is true not only within the corporate market, but many other market segments as well. In the corporate market, Ethernet has long dominated at all levels, especially with the advent of high-performance Ethernet switching. This includes workgroup, departmental, server and backbone/campus networks. Even though many of the Internet Service Providers (ISPs) in the market today still base their WAN-side communications on legacy circuit oriented connections (i.e. supporting Frame Relay, xDSL, ATM, SONET), their back-office communications are almost exclusively Ethernet. In the residential market, most individual users are deploying 10 or 100 Mbps Ethernet within their homes to connect PCs to printers and to other PCs (in fact, most PCs today ship with internal Ethernet cards) even though the residential community still utilizes a wide range of relatively low-speed, circuit-oriented network access technologies.

The use of Ethernet, both optical and electrical based, is increasing in carrier networks due to advantages of Ethernet and in particular Optical Ethernet, namely its ability to scale from low speeds to very high rates and its commodity-oriented nature. With the rapid increase in the demand for user bandwidth, and the equally impressive increase in the performance of Ethernet with the LAN environment, the demand for Metropolitan network performance is rapidly increasing. In response, there has been a massive explosion in the amount of fiber being installed into both new and existing facilities. This is true for both the corporate and residential markets.

A problem arises, however, how to transfer legacy TDM traffic over an asynchronous Ethernet network and particularly, how to extract and reconstruct the TDM clock from the received data at the other side. It is important that the clock used at the receive side be traceable to the clock used at the transmitter. The clock at the transmitter side can be provided from an external source, a clock distribution network or from SONET/SDH equipment.

One prior art solution is to break the TDM traffic into several channels and convert the voice data to IP packets using DSP algorithms and then switch this IP traffic over the network. This approach, however, does not address transporting TDM traffic over asynchronous Ethernet networks.

Other schemes attempt to recover the TDM clock by maintaining a buffer and a pointer whereby if the slave clock is following the master clock, the pointer is designed to stay in the mid point of the buffer. Deviations of the slave clock from the master clock cause the pointer to move away from the mid point of the buffer. The location of the pointer is monitored and suitable action taken if it is detected to have moved.

A disadvantage of this scheme, however, is that the jitter and wonder generated is relatively high and typically does not meet common carrier telecommunication standards. In addition, the scheme cannot track the master clock in the event a large number of packets are lost. The scheme is overly sensitive to lost and erroneous packets.

SUMMARY OF THE INVENTION

The present invention comprises a clock reconstruction mechanism for synchronous TDM communications traffic that is transported over asynchronous networks such as Ethernet networks. The TDM synchronous traffic comprises any type of synchronous data stream such as SONET/SDH/PDH data streams which include commonly found T1, E1, etc. The present invention is suitable for use wherever synchronous traffic must be transported over asynchronous networks. In particular, the invention is applicable in edge switches in Metropolitan Area Networks (MANs) that comprise some form of Circuit Emulation System (CES) adapted to segment or encapsulation TDM traffic and to transport the synchronous TDM data across the Ethernet network.

The mechanism is operative to segment the input TDM data stream into Ethernet packets and to generate and insert a network timestamp within the packet. The network timestamp is generated at the master CES using an available external clock traceable to the TDM data, e.g., Stratum 1 clock source, etc. The network timestamp is generated close to when the packet leaves the transmitter towards the destination over the Ethernet network.

At the receiver or slave CES, a local timestamp is generated for each received packet as it is received. The network timestamp is extracted and input along with the local timestamp to a Digital Time Locked Loop (DTLL) that is operative to filter a plurality of points of data using a suitable filter algorithm. In one embodiment, a Least Squares Regression (LSR) algorithm and Infinite Impulse Response (IIR) filter algorithm are used in combination to generate a clock control signal that is then input to the DAC followed by a VCO to generate the reconstructed clock.

In the filter, the LSR algorithm is used initially to quickly converge to a coarse frequency using only a few data points. The clock generated from the LSR using relatively few data points, has too much jitter and wonder. The IIR filter algorithm is used to refine the clock frequency but takes a longer time to converge. The resultant clock is, however, very stable due to the large number of sample points used.

It is important to point out that the clock reconstruction algorithm is insensitive to the delays in the network since the algorithm considers the differences in timestamps and not absolute values. In addition, the filtering is performed over a large number of timestamps, thus averaging the effects of any noise causes by variations in the network delay. The larger the number of samples, the less sensitive the IIR filter becomes to variations in network delay (i.e. noise).

In addition, the clock reconstruction mechanism of the present invention is relatively insensitive to packet loss, as the arrival of one or a few packets has minimal influence on the frequency of the reconstructed clock. It is the timestamp inside the packet that is compared to the local timestamp.

It is important to also note that the invention is not limited by the type of asynchronous network in use, the PHY layer, the type of signaling in use or by whether provisioning is based on signaling or performed in the management plane. The invention is applicable to other asynchronous networks as well.

Note also that the invention is suited for implementation in hardware such as a network processor (which may comprise a network-processor chip, an FPGA, an ASIC, etc.), adapted to implement the TDM clock reconstruction mechanism of the present invention, software or a combination of hardware and software. In one embodiment, a network device comprising a processor, memory, etc. is operative to execute software adapted to perform the TDM clock reconstruction mechanism of the present invention.

The clock reconstruction mechanism of the present invention has been implemented and embodied in a commercially available product A-2100 Optical Ethernet Edge Switch manufactured by Atrica Inc., Santa Clara, Calif.

There is therefore provided in accordance with the present invention a method of clock synchronization for use in transporting synchronous traffic over an asynchronous network, the method comprising the steps of extracting a network timestamp from packets transported over the asynchronous network, generating a local timestamp for each received packet utilizing a local clock source, applying a filtering function operative to generate a clock control signal as a function of the network timestamp, the local timestamp and frequency characteristics of the local clock and adjusting the local clock source in accordance with the clock control signal so as to generate a reconstructed clock therefrom.

There is also provided in accordance with the present invention an apparatus for reconstructing a clock for synchronous traffic transported over an asynchronous network comprising means for extracting a network timestamp from packets received over the asynchronous network, the network timestamp generated using a master clock and transported over the asynchronous network, means for generating a local timestamp for each received packet from utilizing a reconstructed clock generated by a local clock source, a filter adapted to track differences between the local clock and the master clock utilizing the network timestamp and the local timestamp and to generate a clock control signal in response thereto and a clock generator comprising the local clock source and adapted to output the reconstructed clock having a frequency determined in accordance with the clock control signal.

There is further provided in accordance with the present invention a Circuit Emulation Services (CES) apparatus for transmitting and receiving synchronous TDM traffic over an synchronous Ethernet network comprising a PHY circuit adapted to receive and to transmit Time Division Multiplexing (TDM) based communications, an encapsulation module comprising means for segmenting received TDM frames into one or more Ethernet packets, means for generating and inserting a network timestamp in each Ethernet packet before transmission over the Ethernet network, means for receiving Ethernet packets from the Ethernet network, re-assembling TDM frames and extracting received network timestamps therefrom, the re-assembled TDM frames output utilizing a reconstructed TDM clock, a clock reconstruction module adapted to generate the reconstructed TDM clock and comprising means for generating a local timestamp for each received packet utilizing the reconstructed clock generated by a local clock source, a filter adapted to track differences between the local clock and a master clock used to generate the received network timestamp utilizing the received network timestamp and the local timestamp and to generate a clock control signal in response thereto and a clock generator comprising the local clock source and adapted to output the reconstructed clock having a frequency determined in accordance with the clock control signal.

There is also provided in accordance with the present invention an edge switch in a Virtual Local Area Network (VLAN) based stack comprising a plurality of user ports for interfacing the edge switch to one or more users, a circuit Emulation Services (CES) module comprising a PHY circuit adapted to receive and to transmit Time Division Multiplexing (TDM) based communications, an encapsulation module comprising means for segmenting received TDM frames into one or more Ethernet packets, means for generating and inserting a network timestamp in each Ethernet packet before transmission over the Ethernet network and means for receiving Ethernet packets from the Ethernet network, re-assembling TDM frames and extracting received network timestamps therefrom, the re-assembled TDM frames output utilizing a reconstructed TDM clock, a clock reconstruction module adapted to generate the reconstructed TDM clock and comprising means for generating a local timestamp for each received packet utilizing the reconstructed clock generated by a local clock source, a filter adapted to track differences between the local clock and a master clock used to generate the received network timestamp utilizing the received network timestamp and the local timestamp and to generate a clock control signal in response thereto and a clock generator comprising the local clock source and adapted to output the reconstructed clock having a frequency determined in accordance with the clock control signal, a plurality of network ports for interfacing the edge switch to one or more communication links and a packet processor comprising ingress packet processing means and egress packet processing means.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| ASIC | Application Specific Integrated Circuit |
| ATM | Asynchronous Transfer Mode |
| CD-ROM | Compact Disc-Read Only Memory |
| CES | Circuit Emulation System |
| CPU | Central Processing Unit |
| CSIX | Common Switch Interface |
| DAC | Digital to Analog Converter |
| DAT | Digital Audio Tape |
| DSL | Digital Subscriber Line |
| DSLAM | Digital Subscriber Line Access Multiplexer |
| DSP | Digital Signal Processor |
| DTLL | Digital Time Locked Loop |
| DVD | Digital Versatile Disk |
| EEPROM | Electrically Erasable Programmable Read Only Memory |
| EPROM | Erasable Programmable Read Only Memory |
| FDDI | Fiber Distributed Data Interface |
| FPGA | Field Programmable Gate Array |
| GE | Gigabit Ethernet |
| IEEE | Institute of Electrical and Electronic Engineers |
| IIR | Infinite Impulse Response |
| IP | Internet Protocol |
| ISP | Internet Service Provider |
| LAN | Local Area Network |
| LSR | Least Squares Regression |
| MAC | Media Access Control |
| MAN | Metropolitan Area Network |
| MEF | Metro Ethernet Forum |
| MPLS | Multi-Protocol Label Switching |
| NIC | Network Interface Card |
| NMS | Network Management System |
| PC | Personal Computer |
| PDH | Plesiochronous Digital Hierarchy |
| PM | Performance Monitoring |
| RAM | Random Access Memory |
| ROM | Read Only Memory |
| RPR | Resilient Packet Ring |
| SDH | Synchronous Digital Hierarchy |
| SONET | Synchronous Optical Network |
| TDM | Time Division Multiplexing |
| VCO | Voltage Controlled Oscillator |
| VLAN | Virtual Local Area Network |
| WAN | Wide Area Network. |

DETAILED DESCRIPTION OF THE INVENTION

The present invention comprises a clock reconstruction mechanism for synchronous TDM communications traffic that is transported over asynchronous networks such as Ethernet networks. The TDM synchronous traffic comprises any type of synchronous data streams such SONET/SDH/PDH data streams including commonly used T1, E1, etc. The present invention is suitable for use wherever synchronous traffic must be transported over asynchronous networks. In particular, the invention is applicable in edge switches in Metropolitan Area Networks (MANs) that comprise some form of Circuit Emulation System (CES) adapted to segment or encapsulation TDM traffic and to transport the synchronous TDM data across the Ethernet network.

The mechanism is operative to segment the input TDM data stream into Ethernet packets and to generate and insert a network timestamp within the packet. The network timestamp is generated at the master CES using an available external clock traceable to the TDM data, e.g., Stratum 1 clock source, etc. The network timestamp is generated close to when the packet leaves the transmitter towards the destination over the Ethernet network.

At the receiver or slave CES, a local timestamp is generated for each received packet as it is received. The network timestamp is extracted and input along with the local timestamp to a Digital Time Locked Loop (DTLL) that is operative to filter a plurality of points of data using a suitable filter algorithm. In one embodiment, a Least Squares Regression (LSR) algorithm and Infinite Impulse Response (IIR) filter algorithm are used in combination to generate a clock control signal that is then input to the DAC followed by a VCO to generate the reconstructed clock.

An example embodiment is provided to illustrate the clock reconstruction mechanism of the present invention. It is not intended, however, that the invention be limited to the configurations and embodiments described herein. It is appreciated that one skilled in the networking, electrical and/or software arts may apply the principles of the present invention to numerous other types of networking devices and network configurations as well, including other types of synchronous data streams and asynchronous transport networks without departing from the spirit and scope of the invention.

Figure 1:
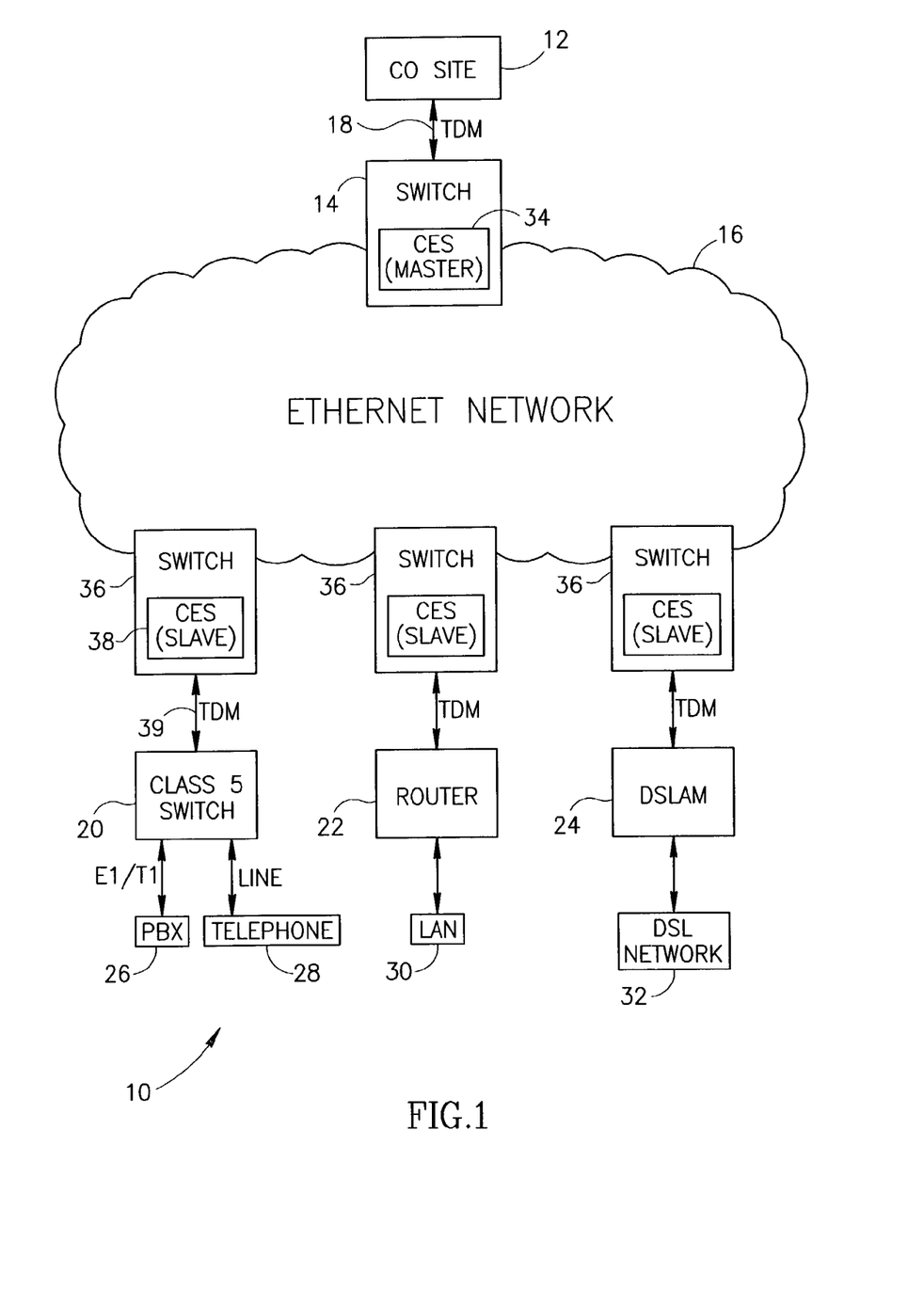
FIG. 1 is a block diagram illustrating an example network comprising a plurality of switches having Circuit Emulation Services (CES) modules incorporating the clock reconstruction scheme of the present invention whereby synchronous TDM traffic is transported over an asynchronous Ethernet network.

A block diagram illustrating an example network comprising a plurality of switches having Circuit Emulation Services (CES) modules incorporating the clock reconstruction scheme of the present invention whereby synchronous TDM traffic is transported over an asynchronous Ethernet network is shown in FIG. 1. The example network, generally referenced 10, comprises an asynchronous network 16 such as an Ethernet network which is used to transport synchronous data such as T1/E1 time division multiplexed (TDM) data. The network comprises a plurality of switches comprising Circuit Emulation Services (CES) modules for emulating TDM circuits over asynchronous networks such as Ethernet networks. Two main components of the CES comprise (1) an encapsulation machine that encapsulate and de-encapsulate TDM to and from the Ethernet network and (2) a clock reconstruction or synchronization machine that extracts and reconstructs the TDM clock from the incoming data.

In operation, TDM traffic 18 generated by the CO site 12 is forwarded to the switch 14 where it is encapsulated and transmitted over the asynchronous Ethernet network via CES module 34. It is assumed that the CES in the switch connected to the CO site has access to a clock that can be traced back to a TDM clock source, e.g., Stratum 3 clock, etc. This CES module is termed the master since it has access to a TDM clock. The CES module enables the transmission of TDM traffic through the Ethernet network. If desired, the CES can replace conventional SONET/SDH equipment deployed in the MAN. In particular, the Add/Drop Multiplexer (ADM) can be replaced by the CES module.

On the ingress side, the CES performs segmentation and encapsulation of the TSM data streams, attaches a header to the TDM payload and delivers them as Ethernet packets with VLAN tagging complying with IEEE 802.1Q standard towards the destination switch. The TDM payload structure is configured such that multiple TDM user ports (e.g., 4) can be grouped to one connection and in addition, multiple TDM frames (e.g., 8) of each TDM user port can be encapsulated in a single Ethernet packet.

On the egress side the encapsulated Ethernet packets are received by the destination switches, e.g., switches 36. The CES modules 38 in each switch are operative to transform the Ethernet packets into TDM data streams. The user port encapsulation order is not necessarily preserved, i.e. every source TDM user port can be delivered to every destination TDM user port. The CES modules utilize data inserted by the master CES into the header of the TDM payload at the transmitter and transported over the Ethernet network in the same packet as the data. At the receiver, the data is extracted and used to reconstruct the TDM clock. Thus, at the egress side, access to a clock traceable to the original TDM clock is not required. The CES is operative to reconstruct the clock without access to the original TDM clock at the egress switch. The TDM data 39 is clocked out by the framer in the slave CES to the particular attached equipment, e.g., Class 5 switch 20, router 22 or DSLAM 24. In this example, the Class 5 switch is connected to PBX equipment 26 via T1/E1 connections and/or telephone circuits 28; the router is connected to a LAN 30 and the DSLAM is connected to a DSL network 32.

Figure 2:
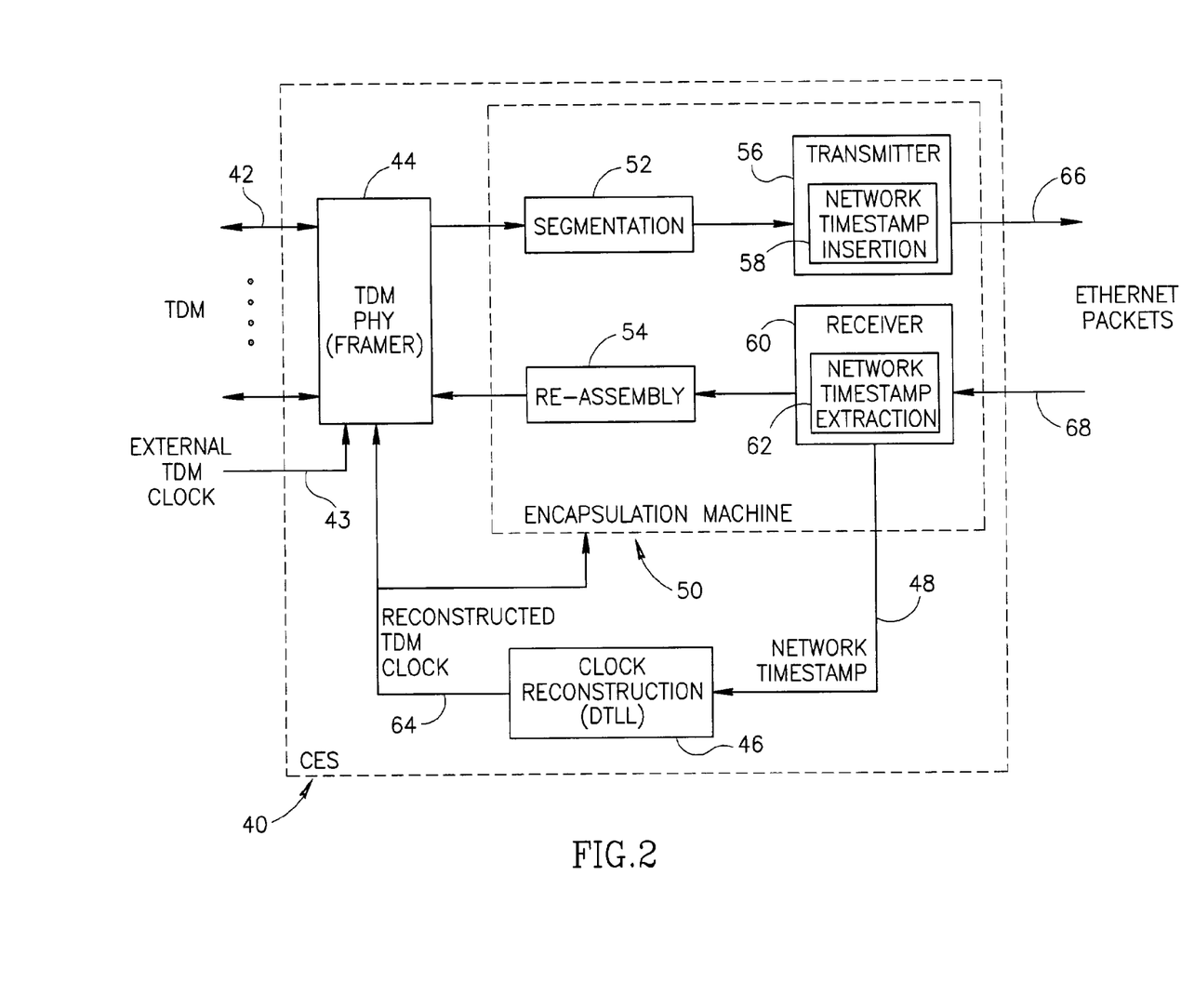
FIG. 2 is a block diagram illustrating the CES module incorporating the Digital Time Locked Loop (DTLL) circuitry of the present invention.

A block diagram illustrating the CES module incorporating the Digital Time Locked Loop (DTLL) circuitry of the present invention is shown in FIG. 2. The CES module, generally referenced 40, comprises a TDM PHY 44 commonly referred to as a framer, an encapsulation machine 50 and a clock reconstruction (or synchronization) module 46 which functions to implement a Digital Time Locked Loop (DTLL). The encapsulation machine comprises a segmentation (encapsulation) unit 52, transmitter 56 comprising a network timestamp insertion unit 58 incorporated therein, receiver 60 comprising network timestamp extraction unit 62, and re-assembly (de-encapsulation) unit 54.

The framer functions to interface the CES to one or more TDM communication line 42 such as E1, T1, T3, E3, etc. in both the receive and transmit directions. In addition, the framer is adapted to accept an external TDM clock 43 that is traceable to a TDM clock higher up in the TDM hierarchy. Optionally, the framer may be adapted to accept other types of clock sources as well such as a local clock or a line clock. Note that the external clock is only required at the master CES since the slave CES modules are operative to reconstruct the clock from the received data in accordance with the invention. The framer typically performs additional functions such as maintaining counters for performance monitoring purposes, providing external monitoring ability, etc.

The data received from the TDM data streams are segmented by the segmentation unit and one or more TDM frames are encapsulated into Ethernet packets. Depending on the implementation, more than one TDM frame may be encapsulated into a single Ethernet packet. Alternatively, a TDM frame may span more than one Ethernet packet. The packets are forwarded to the transmitter where a network timestamp is generated and inserted into the packet just before it is output from the switch. The packets 66 output from the transmitter comprise the TDM data, header information and the network timestamp. In addition, a 16-bit sequential sequence number is also generated and inserted into the Ethernet packet. The sequence number is used by the receiver CES in the event packets arrive misordered.

In the opposite direction packets 68 are received over the Ethernet network and are input to the receiver 60. The network timestamp 48 within the packet is extracted via the network timestamp extraction unit 62 and forwarded to the clock reconstruction module 46. The TDM data is extracted from the received packets and re-assembled via re-assembly unit 54. The re-assembled TDM data is input to the framer for transmission onto the TDM communication line. The clock reconstruction module implements a DTLL that is operative to reconstruct and output the TDM clock 64. The clock output is input to the framer and is used to generate the synchronous TDM output data stream. Note that alternatively, the output of the clock reconstruction module may comprise a clock control signal that corresponds to the desired clock frequency. The clock output may also be used by the transmitter in the encapsulation machine to generate the network timestamp that is inserted in the outgoing packet. In most cases, this is not required, since the other end of the connection (i.e. the master side) comprises the master CES with access to the external TDM clock. Thus the clock reconstruction module functionality is not required on the master side. Note that the clock reconstruction module is only required in the receive or slave side of the connection, since the TDM clock is available at the master end of the connection.

Figure 3:
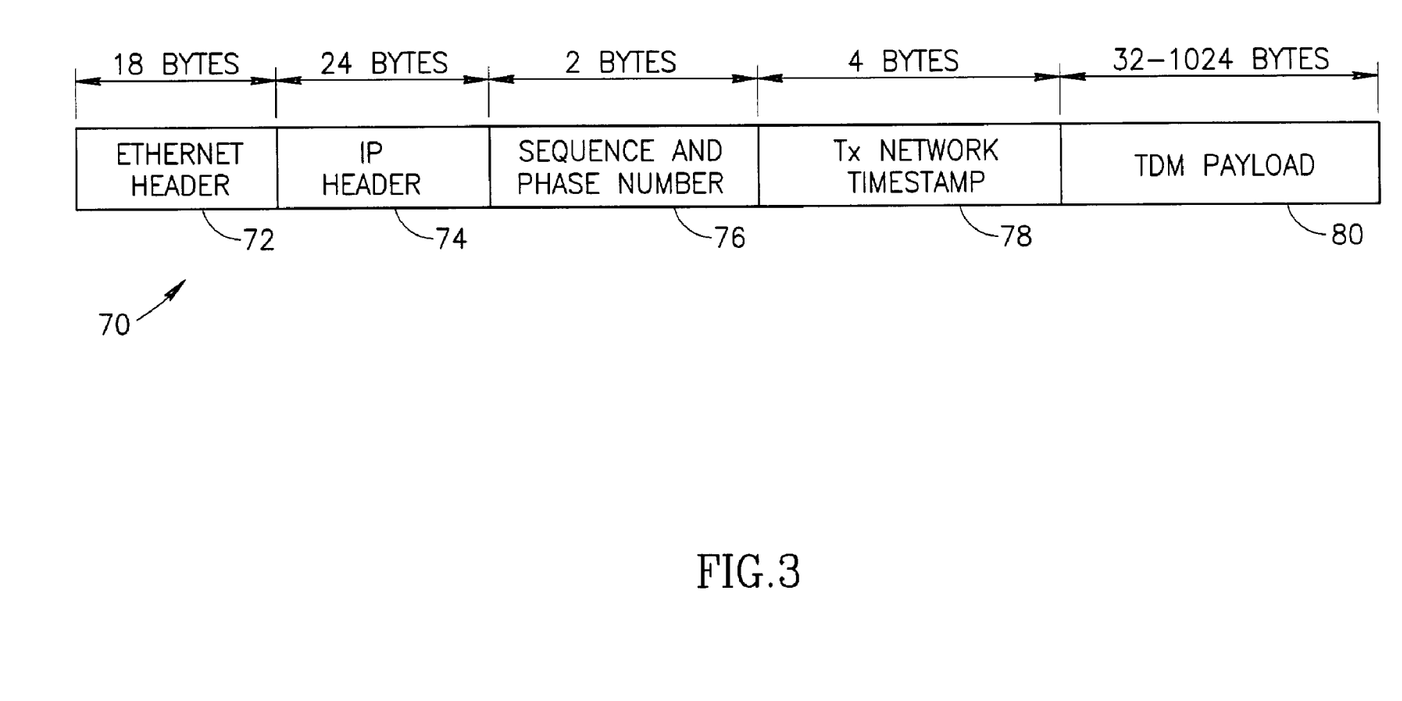
FIG. 3 is a diagram illustrating the structure of an Ethernet packet adapted to transport a sequence number, phase number and transmitter generated network timestamp.

A diagram illustrating the structure of an Ethernet packet adapted to transport a sequence number, phase number and transmitter generated network timestamp is shown in FIG. 3. In accordance with the present invention, the TDM 'signals' are sent through the Ethernet network as packets. The Ethernet packets are modified to transport the sequence, phase number and the network timestamp. In particular, the Ethernet packet, generally referenced 70, comprises a plurality of fields comprising: an 18 byte Ethernet header 72, a 24 byte IP header, two bytes for sequence and phase numbers, a 4 byte timestamp and 32-1024 bytes of TDM payload.

Figure 4:
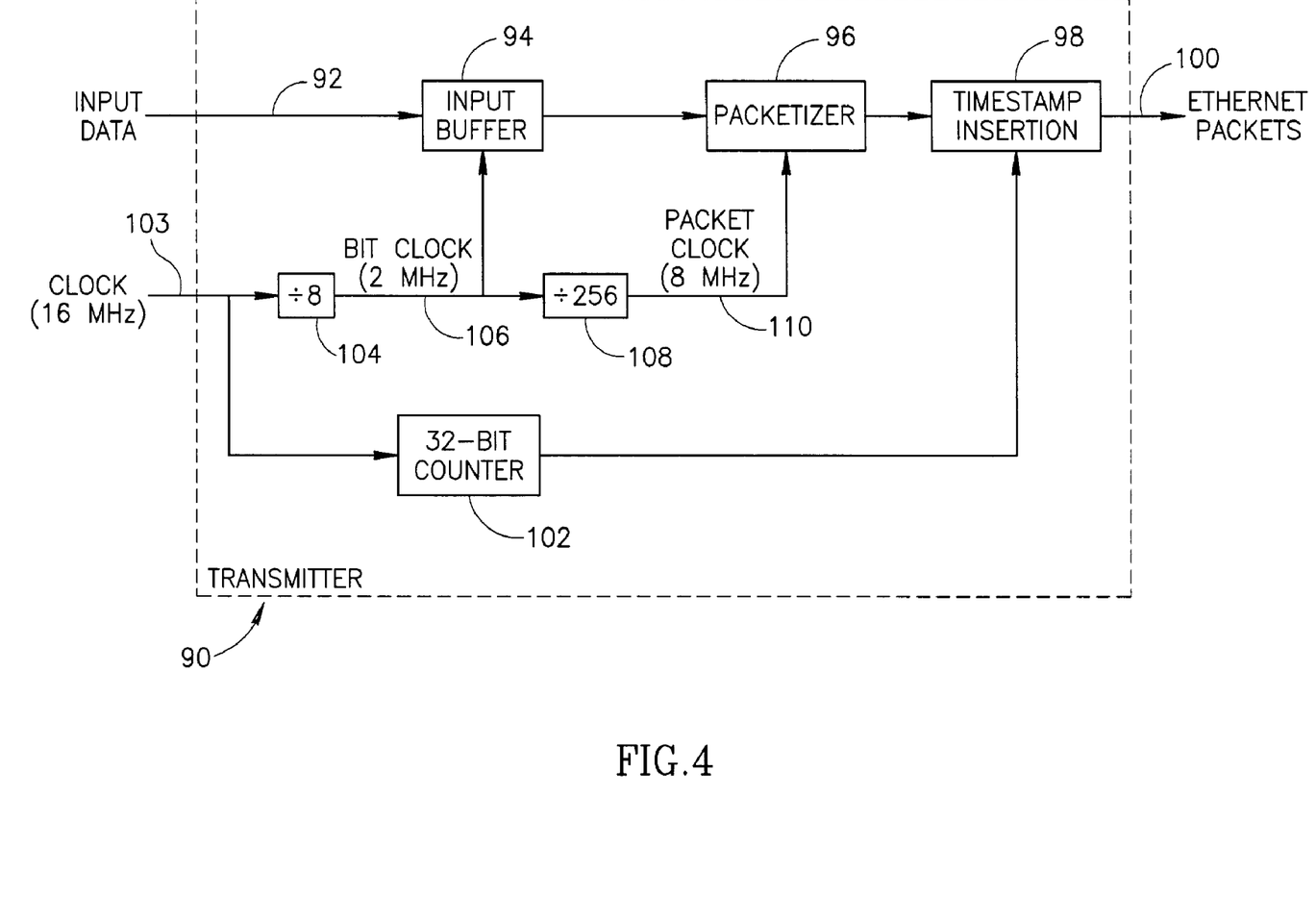
FIG. 4 is a block diagram illustrating the transmitter of the CES module of the present invention in more detail.

A block diagram illustrating the transmitter of the CES module of the present invention in more detail is shown in FIG. 4. The transmitter, generally referenced 90, comprises an input buffer 94, packetizer 96, timestamp generator 98 and counter 102. A 16 MHz local clock source 103 is used to derive the various clocks required by the transmitter module. The 16 MHz clock is the reconstructed cock generated by the clock reconstruction module based on the TDM clock timing related data extracted from the packets transported over the Ethernet from the transmitter.

Note that for illustration purposes, the invention is described in the context of a CES adapted to transport E1 data that is clocked at 2 MHz data rates. One skilled in the art, however, can adapt the CES module to handle other data rates as well such as T1, T3, E3, etc. without departing from the scope of the invention.

In operation, input data 92 from the segmentation unit 52 (FIG. 2) is stored in an input buffer 94. The input buffer is clocked by the 16 MHz clock after a divide by eight 104 to generate a 2 MHz E1 rate clock 106. Data from the input buffer is then input to the packetizer 96 which functions to place the TDM stream into Ethernet packets. The 2 MHz clock is further divided by 256 via divider 256 to generate an 8 kHz packet clock 110. The packetizer uses the packet clock to generate an Ethernet packet at every E1 frame time. The Ethernet packets are forwarded to a timestamp insertion unit 98 which functions to insert a network timestamp preferably just before the packet is output over the Ethernet network. The timestamp is generated by a free running wrap around counter 102 that is preferably at least 32 bits. The resolution and degree of jitter and wonder of the reconstructed clock at the receiver is influenced by the width of the network timestamp transported in the packet. The output Ethernet packets 100 are then transmitted onto the Ethernet network towards the destination receiver.

Figure 5:
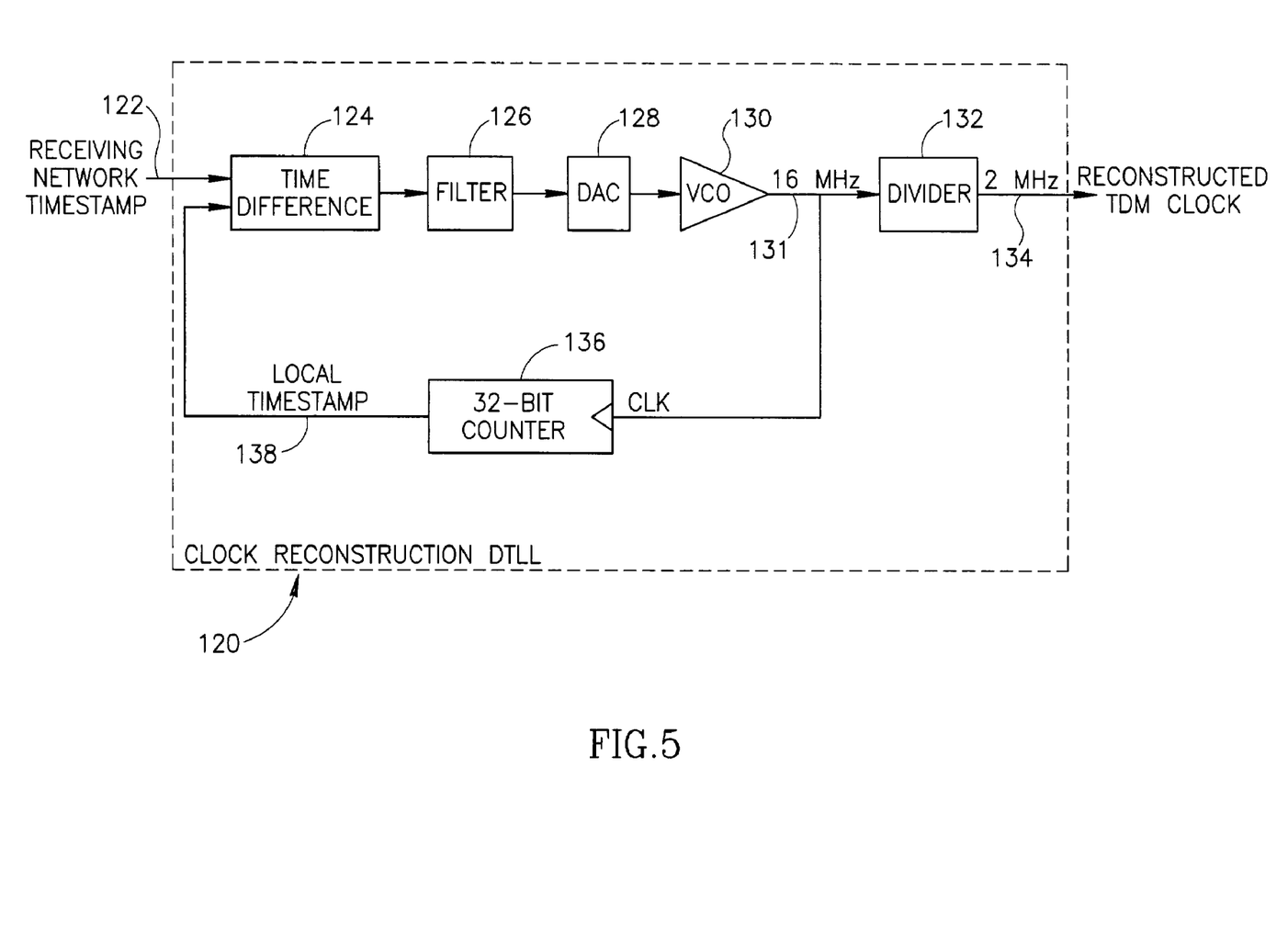
FIG. 5 is a block diagram illustrating an example clock reconstruction Digital Time Locked Loop (DTLL) module constructed in accordance with an embodiment of the present invention.

The clock reconstruction scheme of the present invention will now be described in more detail. A block diagram illustrating an example clock reconstruction Digital Time Locked Loop (DTLL) module constructed in accordance with an embodiment of the present invention is shown in FIG. 5. The clock reconstruction DTLL module, generally referenced 120, comprises a time difference unit 124, filter block 126, digital to analog converter (DAC) 128, voltage controlled oscillator (VCO) 130, divider 132 and counter 136. The clock reconstruction module is operative to function as a DTLL wherein the differences between the network timestamp 122 and a locally generated timestamp 138 are tracked and locked such that the original TDM clock 134 is recovered, e.g., 2 MHz E1 clock. The accuracy of the reconstructed clock in terms of frequency, jitter, jitter tolerance, wonder and other parameters is sufficient to meet carrier standards such as G.703, G.823 for E1 rates and I.431, G.703, TR-TSY 499, TR-TSY 253 for T1 rates.

The DTLL loop comprises the difference circuit, filter, DAC, VCO and counter. In operation, the local timestamp is generated by a free running 32-bit counter. The clock for the counter comprises the 16 MHz signal 131 generated by the VCO. The nominal frequency of the VCO is 16 MHz which is 8 times the TDM data rate of 2 MHz. In general, the counters in the transmitter and receiver are clocked at a rate that is a multiple of the TDM rate. This is to increase the accuracy of the reconstructed clock at the receiver. In addition, 32-bit counters are used to provide sufficient resolution for the DTLL filter to discern differences between the master and slave clocks.

The filter is operative to generate a clock control signal based on the values of the received network timestamp and the locally generated timestamp. The local timestamp is generated upon receipt of a packet. The digital clock control signal is converted into an analog signal by the DAC and applied to the VCO. The output of the VCO constitutes the clock for the free running 32-bit counter used to generate the local timestamp. The 16 MHz output of the VCO is also input to a divide by eight divider 132 which functions to output the reconstructed TDM clock (e.g., 2 MHz E1 clock) used by the framer to generate the output TDM data stream.

In an example embodiment, the time or phase detector 124 and the filter block are implemented using a DSP, MCU, microprocessor or other processing device. The DAC comprises a 12-bit DAC. The VCO may comprise a VCXO configured to generate a 16 MHz nominal frequency signal. The VCXO may be configured to generate other frequencies in accordance with the frequency of the particular TDM stream to be transported across the Ethernet network. The remaining functions are provided by the encapsulation machine circuitry incorporated in an FPGA and adapted to implement frequency division, network timestamp extraction, local timestamp generation and delivery of the TLL control parameters and performance monitoring (PM) registers from/towards the CPU or other central controller accordingly.

The DTLL is operative to generate the TDM clock according to the differences between the network timestamps and the local timestamps as read from the counter at the time a packet arrives. The DTLL implements a closed loop tracking system wherein the equilibrium point is a constant value of network timestamp minus local timestamp. Deviations in the equilibrium point are corrected by the DTLL.

Figure 6:
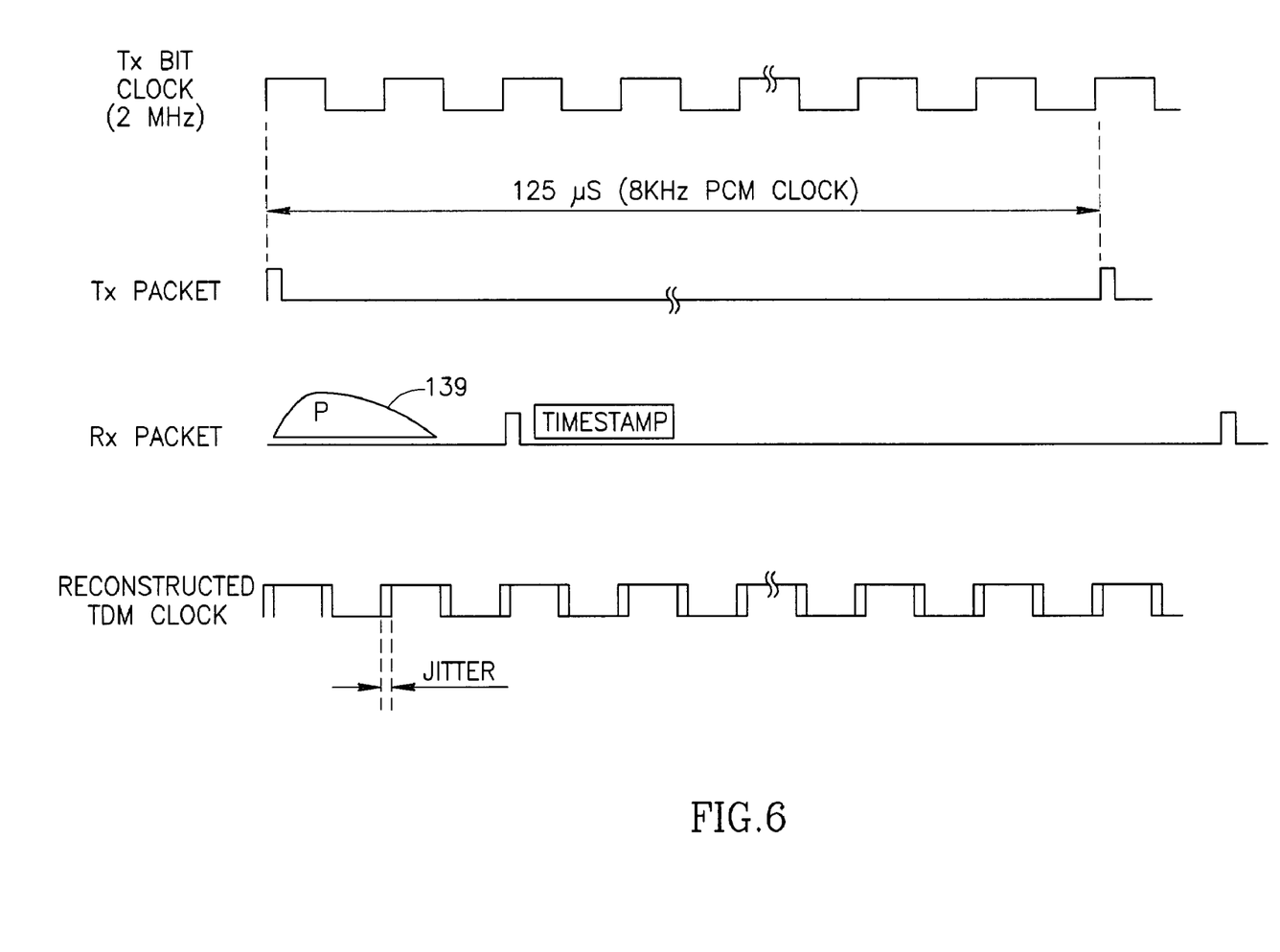
FIG. 6 is a diagram illustrating the timing of the transmit and receive packets incorporating the network timestamp in accordance with the present invention.

A diagram illustrating the timing of the transmit and receive packets incorporating the network timestamp in accordance with the present invention is shown in FIG. 6. The timing of the Tx packet, Rx packet and reconstructed local clock is shown in relation to the original 2 MHz E1 transmit bit clock. The transmitter is operative to generate a Tx Ethernet packet every E1 frame which is 125 microseconds long corresponding to the 8 kHz PCM clock. Thus, a network timestamp is transmitted every packet time. Probability of arrival of the packet at the receiver is variable and is constantly changing due to changing conditions in the network. Eventually, the packet arrives but the arrival times cannot be predicted. Packets may get lost, they may arrive out of order and may arrive with difference delays. For this reason, the invention does not use the 8 kHz TDM rate embodied in the absolute packet arrival times to reconstruct the TDM clock. Rather, the present invention utilizes the relative difference between the network timestamp and the local timestamp in reconstructing the local clock. In addition, the local clock is recovered based on data derived from a large number of sets of timestamps. The reconstruction mechanism is operative to lock onto the frequency of the master clock and in addition to maintain the amount of clock jitter at a low enough level to meet carrier transmission standards.

Note that the probability of arrival curve P 139 represents a Poisson delay distribution of the arriving packets. The probability of arrival is zero to the left of the curve and is infinite to the right of the curve. The delay times of arrival vary since Ethernet networks cannot guarantee constant network delays.

Figure 7:
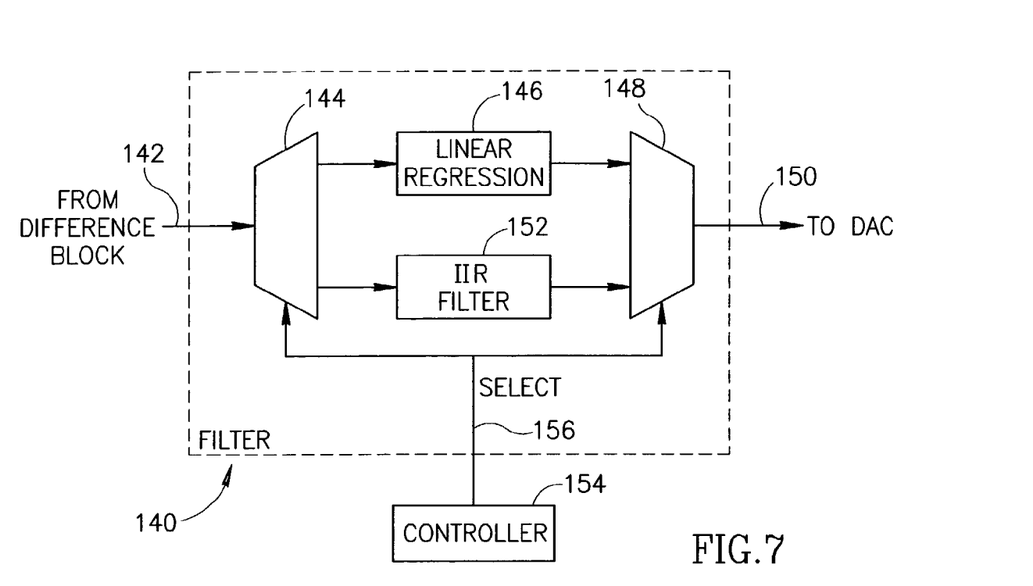
FIG. 7 is a block diagram illustrating an example filter circuit of the CES module constructed in accordance with an embodiment of the present invention.

A block diagram illustrating an example filter circuit of the CES module constructed in accordance with an embodiment of the present invention is shown in FIG. 7. The filter is a key part of the clock synchronization mechanism and is adapted to perform two mathematical functions on the timestamp data. The first is Least Square Regression (LSR) and the second is Infinite Impulse Response (IIR) filtering. Both are described in more detail infra. The filter circuit implements a heuristic whereby the input and output signals of the filter are analyzed and the appropriate action is taken based on the analysis.

The filter block, generally referenced 140, comprises a demultiplexer 144, linear regression module 146, IIR filter module 152 and output multiplexer 148. The input data 142 from the difference block is steered either to the linear regression block or the IIR filter block by the demultiplexer. A controller 154 provides the select control signal 156 for the input demultiplexer and the output multiplexer. Both the linear regression block and the IIR filter are operative to generate a digital clock control signal 150 output that is converted by the DAC to an analog control signal for the VCO.

The Least Squares Regression block is the initial stage of the clock reconstruction mechanism. In this initial stage, the receiver generates a set of measurements that correspond to the difference between the network and local timestamps. The receiver performs a Least Square Linear Regression algorithm on these samples and calculates the initial voltage for the VCXO. The samples are plotted on a graph wherein the X-axis represents the locally generated timestamp and the Y-axis represents the received network timestamp. The best straight line drawn through the sample points that meets the Least Square Linear Regression requirements represents the locked value of clock frequency.

Figure 8:
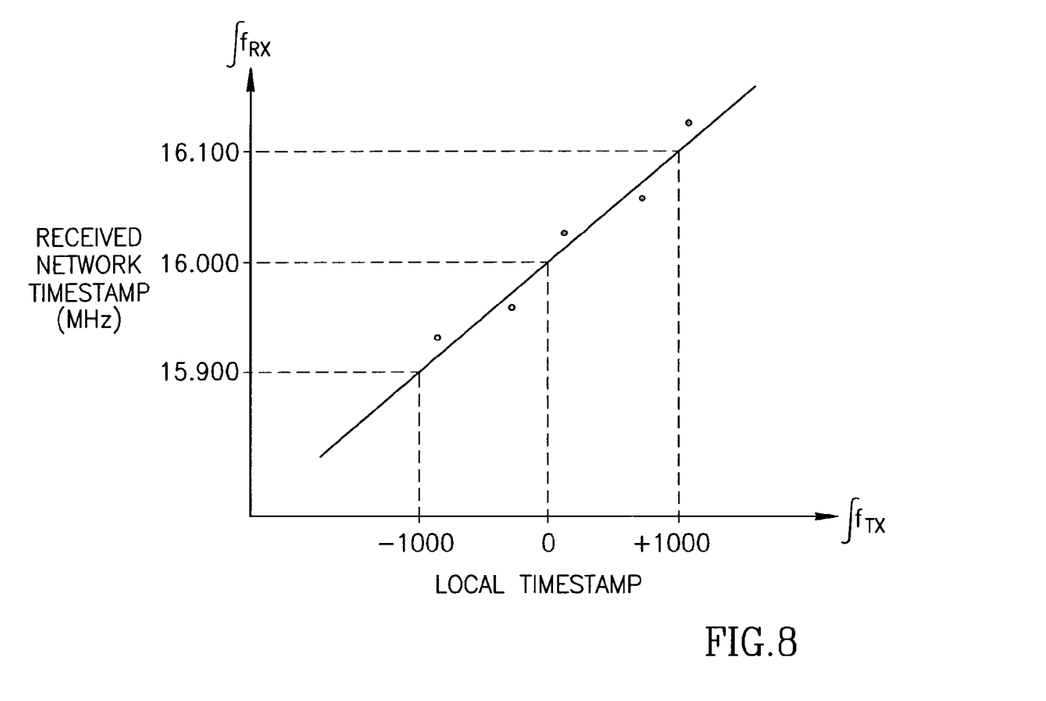
FIG. 8 is a graph of the local timestamp versus the receive network timestamp whereby a Least Squares Regression (LSR) filter is applied to determine the correction to apply to the clock control signal in accordance with an embodiment of the present invention.

An illustrative example is presented below. A graph of the local timestamp versus the receive network timestamp whereby a Least Squares Regression (LSR) filter is applied to determine the correction to apply to the clock control signal in accordance with an embodiment of the present invention is shown in FIG. 8. Depending on the implementation, the timestamps may be normalized before Linear Regression techniques are applied. Linear Regression is used to fit the best straight line through the sample points. The slope of the line indicates how close the local timestamp is tracking the network timestamp which is directly related to how well the local slave clock is tracking the master clock. If the slope of the line is equal to 45 degrees than the two clocks are running at the same frequency. If the slope is greater than 45 degrees, this indicates that the master clock is faster than the local clock and the frequency of the local clock should be increased. Similarly, if the slope is less than 45 degrees, this indicates that the local clock is faster than the master clock and the frequency of the local clock should be reduced.

The LSR algorithm operates on blocks of 64 sample points (i.e. pairs of timestamps). Blocks comprising a higher or lower number of sample points may also be used. Selecting the number of sample points represents a tradeoff between buffer size, delay time and accuracy.

Based on the slope calculated, the clock control signal input to the DAC is adjusted and the VCO output frequency is modified accordingly. The algorithm waits a predetermined period of time for the loop to stabilize with the new frequency before acquiring and processing the next block of 64 samples. Note also that it is desirable to have slow convergence of frequency since slow convergence reduces the output jitter. Fast clock recovery operation typically results in larger amounts of jitter.

In one embodiment, the LSR algorithm is used as quick coarse tuning to quickly acquire the local clock frequency with a sufficient accuracy for the next stage of the clock reconstruction which is the IIR filter. The IIR filter performs the slow fine-tuning of the recovered clock, operates over a large number of sample points and is more accurate than the LST algorithm. Typically, the LSR algorithm is capable of converging to a frequency within a few seconds. In the example embodiment presented herein, only five iterations of the LSR algorithm are required to acquire the initial frequency. The IIR filter requires on the order of several minutes to converge and to generate a stable frequency.

Figure 9:
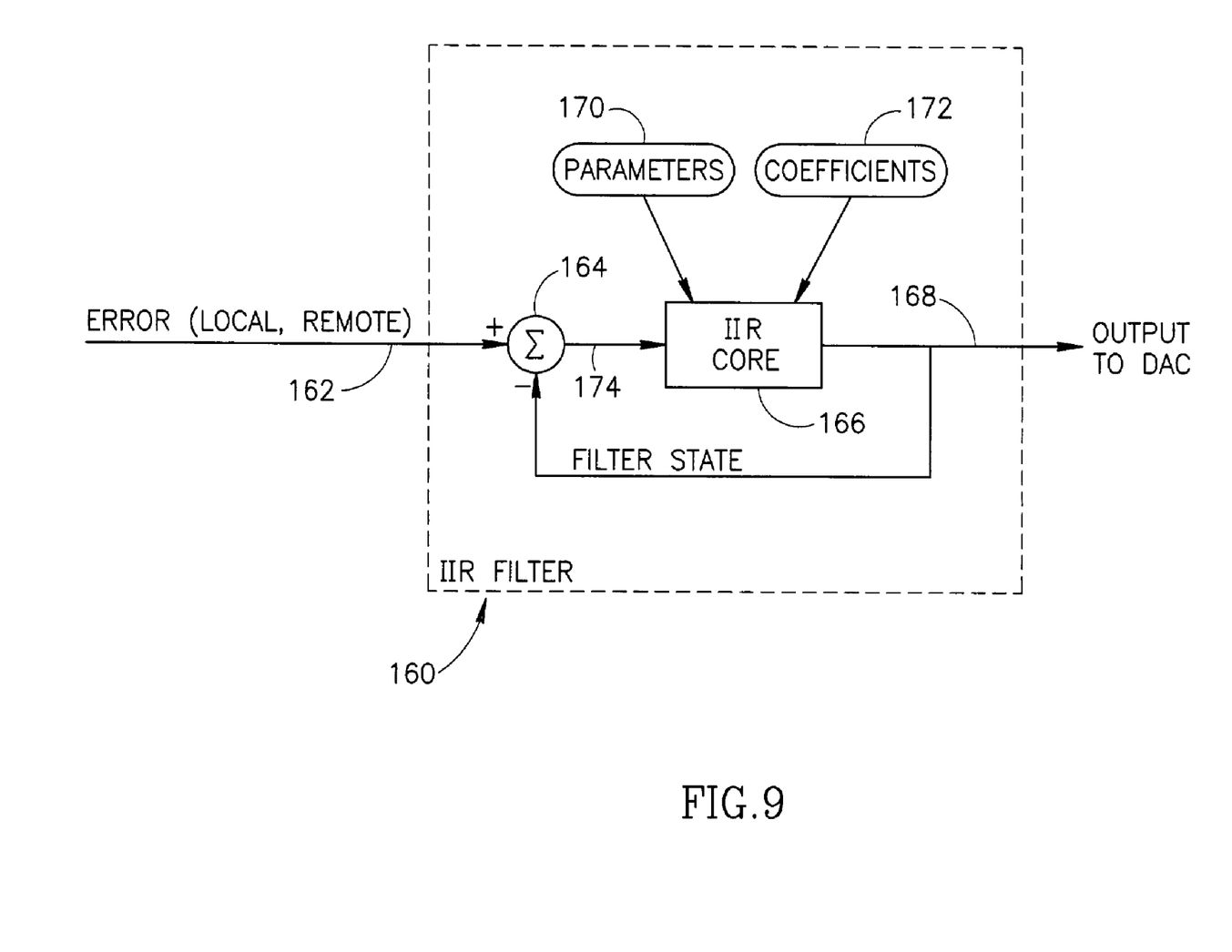
FIG. 9 is a block diagram illustrating an example implementation of the IIR filter constructed in accordance with an embodiment of the present invention.

Infinite Impulse Response filtering is performed after frequency locking is achieved using the Least Squares Regression algorithm. Infinite Impulse Response filtering is performed on the calculated differences between the received network timestamps and the local generated timestamps so as to determine the appropriate input voltage of the VCXO to maintain frequency lock as shown in FIG. 9. The IIR filter, generally referenced 160 comprises a subtractor 164 and IIR filter core 166. The current filter state 168 is subtracted from the input error signal 162 derived from the network and local timestamps to generate a difference signal 174 which is input to the IIR core. Also input to the IIR core are one or more filter parameters 170 and the filter coefficients 172. The output 168 of the IIR core is the clock control signal output to the DAC to generate the analog input signal to the VCXO.

Typically after performing LSR filtering, the jitter is too large to meet the required standards. Therefore, IIR filtering is performed once the LSR algorithm completes. When IIR filtering is begun, it is assumed that the master and local clock frequencies are substantially equal which is the reason why the IIR algorithm can be set to converge slowly. The IIR filter algorithm utilizes several variables including the algorithm state and impulse response state variables. The state variables are modified during each iteration of the filer as occurs in classical IIR filtering. As described supra, the input to the IIR filter algorithm is the difference between the network and local timestamps which are both 32-bit numbers. The timestamps are assumed to be normalized or equivalent and the difference should normally be relatively small. The calculated difference in timestamps is used to calculate new state variables as expressed below in Equation 1.

$$[\text{state}]=(1-\infty)[\text{state}]+\infty \cdot [\text{timestamp difference}] \quad (1)$$

Note that the quantities in brackets represent vector quantities. The update factor cc determines the rate of convergence and the sensitivity of the IIR filter to changes. A suitable value for the update factor $\infty$ is $2^{-20}$ which was found by trial and error. The update factor represents a tradeoff between stability and convergence. A relatively small value for the update factor influences the filter state very little while a larger value allows the filter to better track changes in the master clock frequency. Preferably, it is desirable to set the value of the update factor as small as possible while still being able to track changes. The value given above represents a satisfactory tradeoff between these two competing goals. A small update factor yields a very stable output whereby any one iteration does not influence the filter state very much. The small update factor also yields the smallest clock jitter and wonder. Thus, the stability of the filter is due to the small value given to the update factor. While the filter achieves high stability, the convergence time of the filter is on the order of several minutes.

It is important to note that the clock reconstruction mechanism is not sensitive to lost packets. In the event of lost packets, the previous data is reused so as to implement a holdover or flywheel technique. If several packets are lost, the IIR filter continues to output a stable output due to the small update factor. Worst case, the filter reacquires sync by switching to the LSR algorithm. The output clock, however, will not slide out of its frequency window.

Another advantage is that the state variables in the IIR filter are constantly being updated and thus comprise a huge amount of historical data. The output of the IIR filter is not determined based on any single timestamp but on a large amount of historical data. Thus, the influence of several lost packets on the output clock is minimized. In TDM clock resync systems, on the other hand, lose the clock in the event the clock edge is lost. After the loss of only several clock edges, the clock phase and frequency are lost.

In accordance with the invention, the DTLL is constructed such that the resolution of the stage variables is much larger than the resolution of the DAC. Thus, once the IIR filter converges, the clock control signal input to the DAC typically oscillates between +1 and −1 values (assuming a delta type DAC). As has been found in practice, many times, the clock control signal is constant, i.e. no adjustment is required.

A large number of error packets will, however, affect the clock jitter. Misordered packets do not effect the clock since they are corrected using the sequence numbers transmitted with each packet. In addition, an optional mechanism may be used as a check on the clock frequency whereby the pointer position of the buffer of timestamp values is examined. This technique is well known in the art, whereby the pointer is normally set to lie in the middle of the buffer. Differences in the two clocks will cause the pointer to move out of the middle position.

The controller functions to switch the filtering mechanism between the LSR and IIR filter algorithms in accordance with certain criteria utilizing a mechanism shown in FIG. 7. At startup, the filter is configured to perform the Least Squares Regression algorithm for either a fixed number of iterations or until the frequency converges to with a predetermined error function threshold. At that point, the filter switches and begins to perform IIR filtering. In addition, certain event will cause the filter to restart and switch back to the LSR filtering algorithm. Such events include, but are not limited to, loss of signal, startup, change of configuration parameters of the connection, out of synchronization indication, after a reset operation, after a hop swap operation and after an extended interruption of traffic.

It is noted that running a timestamp inside the packet provides a large amount of information to use for clock reconstruction and synchronization. Since the timestamp counts are accumulative (increase every frame) there are more information bits with every incoming frame. Thus, in effect, all the timestamp measurements are integrated from the time the IIR filter algorithm was last started. By keeping the gap between the timestamps constant (i.e. between network and local timestamps) it is virtually guaranteed that the slave clock frequency substantially matches the frequency of the master clock.

In addition, since the timestamps are generated by a clock that is a multiple of the TDM data rate (e.g., 8 times faster or 16 MHz) than the recovered clock, it can be assured that the phase shift of the recovered clock (jitter or wander) is bounded to 1/[rate factor] of the clock cycle as long as frequency lock is maintained (1/[rate factor]=⅛ in the example presented therein). The quantity rate factor represents how many times faster the recovered clock is compared to the TDM data rate. Using a high frequency clock for the timestamp on both ends provides sufficient information to compensate for significant values of network delay variation parameters.

As an alternative, the filter can be adapted to (1) perform only the LSR algorithm, (2) only the IIR filter algorithm or (3) a combination of the two. In the case where only the LSR algorithm is used for filtering, an additional number of iterations need to be performed to provide the required sensitivity and acceptable levels of jitter and wonder. The LSR algorithm, however, is not set to converge as rapidly since it is desired to increase the accuracy and stability of the reconstructed clock. In addition, the LSR process is adapted to be performed with additional data points.

In the case where only IIR filtering is used, the state variable update factor in the IIR filter is increased in order that the output converge faster while sacrificing a small amount of stability. In the case where both filtering techniques are used the controller is adapted to control the execution of the LSR and IIR filter algorithms based on suitable criteria as described supra.

Implementation of the Clock Reconstruction Module and CES in an Edge Switch

A network device can be adapted to implement the TDM clock reconstruction mechanism fast protection mechanism of the present invention. Hardware means and/or software means adapted to execute the mechanism may be incorporated within a network device such as an access edge switch, Network Management System, Label Switching Router (LSR), network switch or any other wired or wireless network device. The device may be constructed using any combination of hardware and/or software.

Figure 10:
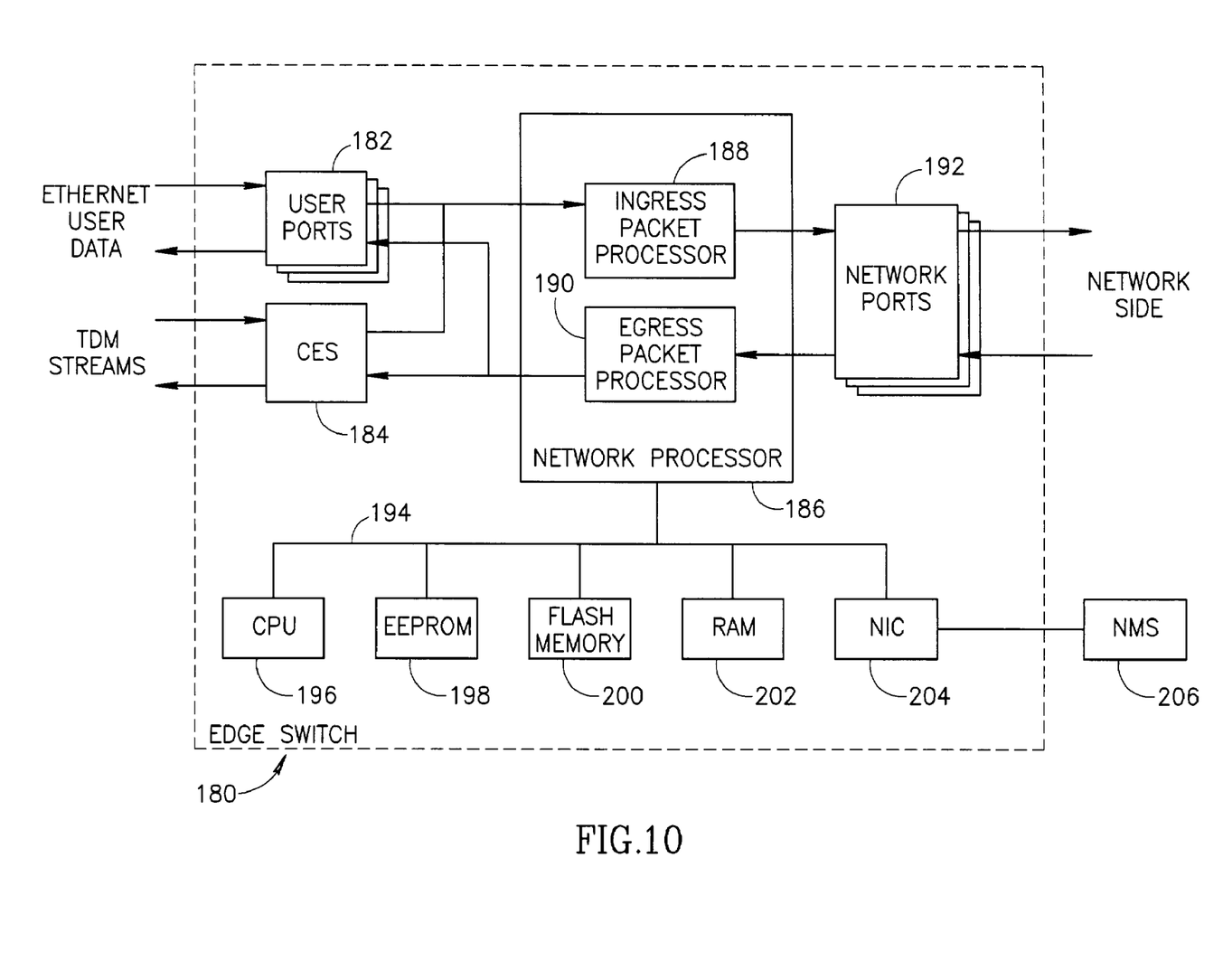
FIG. 10 is a block diagram of an edge switch incorporating the CES and TDM clock reconstruction scheme of the present invention.

A block diagram of an edge switch incorporating the CES and TDM clock reconstruction scheme of the present invention is shown in FIG. 10. The edge switch, generally referenced 150, comprises at its core a network processor 186, one or more user ports 182 and two or more network ports 192, a network interface 204 for interfacing the edge switch to an NMS 206, a central processor 196, e.g., CPU, and both volatile and non-volatile memory including RAM memory 202 for storing data and application program code, Flash memory 200 for storing boot and application code and EEPROM 198 for storing configuration data. The CPU communicates to the network processor, memory peripherals and other support devices via a bus 194. The switch also comprises CES module 184 incorporating the TDM clock reconstruction mechanism of the present invention.

The edge switch comprises a user side and a network side. The user side interfaces to the user via any suitable type of interface, e.g., Gigabit Ethernet (GE), Fast Ethernet (FE), SONTE/SDH/PDH interface (e.g., T1/E1 via the CES), etc. Likewise, the network side interfaces to other edge switches or the core network via any suitable interface such as Optical Ethernet (e.g., 1 GE, 10GE, etc.), TDM, etc.

The CES module implements the TDM clock reconstruction mechanism protection mechanism of the present invention as described hereinabove. Legacy TDM data streams are encapsulated and converted into Ethernet packets. A network timestamp is generated and inserted into the packet before it is transmitted over the Ethernet network.

The network processor implements the switching fabric for providing the switching functionality of the device. Depending on the specific implementation, the switching fabric may comprise, for example, hardware for performing VLAN tagging, MPLS, Frame Relay, ATM switching, CSIX or any other fabric to network interface protocol. The network processor includes a packet-processing engine that comprises an ingress packet processor 188 and an egress packet processor 190. The network processor also comprises timestamp circuits, clock circuits, memory, counters and CPU interface (not shown). The network processor may be implemented as a microcontroller, microprocessor, microcomputer, ASIC core, FPGA core, central processing unit (CPU) or digital signal processor (DSP) or any other suitable computing means.

The edge switch comprises a NIC 204 for providing an out of band interface for connecting to external entities such as a craft for local maintenance and configuration purposes, a NMS for centralized provisioning, administration and control or a Local Area Network (LAN). The edge switch may comprise additional interfaces, such as a serial interface for connecting to a PC for configuration purposes.

The central processor 196 implements the major functionality of the edge switch. In particular, the central processor comprises means for performing Hello (or availability) protocol processing (part of this capability may reside in the network-processor as well). Note that the central processor may be implemented in any suitable manner such as a microcontroller, microprocessor, microcomputer, ASIC core, FPGA core, central processing unit (CPU) or digital signal processor (DSP) or any other computing means.

The user ports and network ports may be implemented on one or more line interface cards that provide the PHY interface to bidirectional communication links, optionally to the MAC interface and part of the switching fabric as well. Note that the invention is not limited to any particular line interface type or link speed. In addition, the invention is not limited to any particular number of user or network ports, as any number of links of each type may be used. Further, the line interface cards may be adapted to interface to any type of communication links such as any variety of copper or optical based Ethernet, Token Ring, FDDI, SONET/SDH, PDH, ATM, RPR, etc.

Similarly, the CES module is not limited to any particular type of SONTE/SDH/PDH or TDM streams, e.g., T1, E1, etc. In addition, the invention is not limited in the number of TDM streams the CES is adapted to encapsulate and de-encapsulate.

The edge device also comprises an optional user interface adapted to respond to user inputs and provide feedback and other status information. A host interface (not shown) enables communication with a host computing device. The host may be adapted to configure, control and maintain the operation of the device. The device may also comprise magnetic storage device means for storing application programs and data.

The network device comprises computer readable storage medium which may include any suitable memory means including but not limited to magnetic storage, optical storage, CD-ROM drive, ZIP drive, DVD drive, DAT cassette, semiconductor based volatile or non-volatile memory, biological memory devices, or any other memory storage device.

Software operative to implement the functionality of the TDM clock reconstruction mechanism of the present invention is adapted to reside on a computer readable medium, such as a magnetic disk within a disk drive unit or any other volatile or nonvolatile memory. Alternatively, the computer readable medium may comprise a floppy disk, Flash memory, EPROM, EEPROM based memory, bubble memory storage, ROM storage, etc. The software adapted to perform the TDM clock reconstruction mechanism of the present invention or any portion thereof may also reside, in whole or in part, in the static or dynamic main memories or in firmware within the processor of the edge switch (i.e. within microcontroller, microprocessor, microcomputer, DSP, etc. internal memory).

In alternative embodiments, the methods of the present invention may be applicable to implementations of the invention in integrated circuits, field programmable gate arrays (FPGAs), chip sets or application specific integrated circuits (ASICs), DSP circuits, wireless implementations and other communication system products.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of clock synchronization for use in transporting synchronous traffic over an asynchronous network, said method comprising the steps of:
   extracting a network timestamp from packets transported over said asynchronous network;
   generating a local timestamp for each received packet utilizing a local clock source;
   fitting a best straight line through sample points of network timestamp data and local timestamp data and generating a clock control signal in accordance with the resulting slope of said line; and
   adjusting said local clock source in accordance with said clock control signal so as to generate a reconstructed clock therefrom.

2. The method according to claim 1, wherein said step of fitting a best straight line is performed to quickly acquire said local reconstructed clock frequency.

3. The method according to claim 2, wherein said clock control signal increases the frequency of said local clock source if said slope is greater than 45 degrees.

4. The method according to claim 2, wherein said clock control signal decreases the frequency of said local clock source if said slope is less than 45 degrees.

5. The method according to claim 2, wherein said slope substantially equal to 45 degrees indicates that the frequency of said local clock source is substantially equal to that of a master clock used to generate said network timestamp.

6. The method according to claim 1, wherein said network timestamp comprises 32 bits.

7. The method according to claim 1, wherein said local timestamp comprises 32 bits.

8. The method according to claim 1, wherein said network timestamp is generated utilizing a 16 MHz clock.

9. The method according to claim 1, wherein the nominal frequency of said local clock source is 16 MHz.

10. The method according to claim 1, wherein said asynchronous network comprises an Ethernet network.

11. The method according to claim 1, wherein said synchronous traffic comprises traffic complying with Time Division Multiplexing (TDM) based T1 or E1 communications standard.

12. The method according to claim 1, further comprising the step of extracting a sequence number from each received packet for use in handling packets received out of sequence.

13. The method according to claim 1, wherein the frequency of said local clock source is a multiple of the data rate of said synchronous traffic.

14. The method according to claim 1, wherein said method implemented in an Application Specific Integrated Circuit (ASIC).

15. The method according to claim 1, wherein said method implemented in a Field Programmable Gate Array (FPGA).

16. An apparatus for reconstructing a clock for synchronous traffic transported over an asynchronous network, comprising:
  means for extracting a network timestamp from packets received over said asynchronous network, said network timestamp generated using a master clock and transported over said asynchronous network;
  means for generating a local timestamp for each received packet from utilizing a reconstructed clock generated by a local clock source;
  a filter to track differences between said local clock and a master clock used to generate said received network timestamp by fitting a best straight line through sample points of said network timestamp and said local timestamp and generating a clock control signal in accordance with the resulting slope of said line; and
  a clock generator comprising said local clock source and to output said reconstructed clock having a frequency determined in accordance with said clock control signal.

17. The apparatus according to claim 16, wherein said clock control signal filter is generated as a function of the frequency characteristics of said local clock.

18. The apparatus according to claim 16, wherein said filter quickly acquire said local reconstructed clock frequency.

19. The apparatus according to claim 18, wherein said filter generates said clock control signal so as to increase the frequency of said local clock source if said slope is greater than 45 degrees.

20. The apparatus according to claim 18, wherein said filter generates said clock control signal so as to decrease the frequency of said local clock source if said slope is less than 45 degrees.

21. The apparatus according to claim 18, wherein said slope substantially equal to 45 degrees indicates that the frequency of said local clock source is substantially equal to that of said master clock.

22. The apparatus according to claim 16, wherein said filter comprises an Infinite Impulse Response (IIR) filter whose input comprises said network timestamp and said local timestamp and whose output comprises an adjustment signal used in generating said clock control signal.

23. The apparatus according to claim 16, wherein said network timestamp comprises 32 bits.

24. The apparatus according to claim 16, wherein said local timestamp comprises 32 bits.

25. The apparatus according to claim 16, wherein said network timestamp is generated utilizing a 16 MHz clock.

26. The apparatus method according to claim 16, wherein the nominal frequency of said local clock source is 16 MHz.

27. The apparatus according to claim 16, wherein said asynchronous network comprises an Ethernet network.

28. The apparatus according to claim 16, wherein said synchronous traffic comprises traffic complying with Time Division Multiplexing (TDM) based T1 or E1 communications standard.

29. The apparatus according to claim 16, wherein said means for generating a local timestamp, said filter and said clock generator operate as a Time Locked Loop (TLL).

30. The apparatus according to claim 16, further comprising the step of extracting a sequence number from each received packet for use in handling packets received out of sequence.

31. The apparatus according to claim 16, wherein the frequency of said local clock source is a multiple of the data rate of said synchronous traffic.

32. The apparatus according to claim 16, wherein said apparatus implemented in an Application Specific Integrated Circuit (ASIC).

33. The apparatus according to claim 16, wherein said apparatus implemented in a Field Programmable Gate Array (FPGA).

34. A Circuit Emulation Services (CES) apparatus for transmitting and receiving synchronous TDM traffic over an synchronous Ethernet network, comprising:
  a PHY circuit for receiving and transmitting Time Division Multiplexing (TDM) based communications;
  an encapsulation module comprising:
    means for segmenting received TDM frames into one or more Ethernet packets;
    means for generating and inserting a network timestamp in each Ethernet packet before transmission over said Ethernet network;
    means for receiving Ethernet packets from said Ethernet network, re-assembling TDM frames and extracting received network timestamps therefrom, said re-assembled TDM frames output utilizing a reconstructed TDM clock;
  a clock reconstruction module for generating said reconstructed TDM clock and comprising:
    means for generating a local timestamp for each received packet utilizing said reconstructed clock generated by a local clock source;
    a filter to track differences between said local clock and a master clock used to generate said received network timestamp by fitting a best straight line through sample points of said network timestamp and said local timestamp and generating a clock control signal in accordance with the resulting slope of said line; and
    a clock generator comprising said local clock source, said clock generator for outputting said reconstructed clock having a frequency determined in accordance with said clock control signal.

35. An edge switch, comprising:
  a plurality of user ports for interfacing said edge switch to one or more users;
  a circuit Emulation Services (CES) module comprising:
    a PHY circuit adapted to receive and to transmit Time Division Multiplexing (TDM) based communications;
    an encapsulation module comprising means for segmenting received TDM frames into one or more Ethernet packets, means for generating and inserting a network timestamp in each Ethernet packet before transmission over said Ethernet network and means for receiving Ethernet packets from said Ethernet network, re-assembling TDM frames and extracting received network timestamps therefrom, said re-assembled TDM frames output utilizing a reconstructed TDM clock;
- a clock reconstruction module for generating said reconstructed TDM clock and comprising means for generating a local timestamp for each received packet utilizing said reconstructed clock generated by a local clock source, a filter for tracking differences between said local clock and a master clock used to generate said received network timestamp by fitting a best straight line through sample points of said network timestamp and said local timestamp and generating a clock control signal in accordance with the resulting slope of said line and a clock generator comprising said local clock source and operative to output said reconstructed clock having a frequency determined in accordance with said clock control signal;
- a plurality of network ports for interfacing said edge switch to one or more communication links; and
- a packet processor comprising ingress packet processing means and egress packet processing means.

36. A method of clock synchronization for use in transporting synchronous traffic over an asynchronous network, said method comprising the steps of:
- extracting a network timestamp from packets transported over said asynchronous network;
- generating a local timestamp for each received packet utilizing a local clock source;
- applying an Infinite Impulse Response (IIR) filter to network timestamp data and local timestamp data to generate a clock adjustment signal; and
- adjusting said local clock source in accordance with said clock adjustment signal so as to generate a reconstructed clock therefrom.

37. A network switch, comprising:
- a plurality of user ports for interfacing said edge switch to one or more users;
- a Circuit Emulation Services (CES) module comprising:
    - a PHY circuit to receive and to transmit Time Division Multiplexing (TDM) based communications;
    - an encapsulation module comprising means for segmenting received TDM frames into one or more Ethernet packets, means for generating and inserting a network timestamp in each Ethernet packet before transmission over said Ethernet network and means for receiving Ethernet packets from said Ethernet network, re-assembling TDM frames and extracting received network timestamps therefrom, said re-assembled TDM frames output utilizing a reconstructed TDM clock;
    - a clock reconstruction module for generating said reconstructed TDM clock, said clock reconstruction module comprising:
        - means for extracting a network timestamp from packets transported over said asynchronous network;
        - means for generating a local timestamp for each received packet utilizing a local clock source;
        - means for applying an Infinite Impulse Response (IIR) filter to network timestamp data and local timestamp data to generate a clock adjustment signal;
        - means for adjusting said local clock source in accordance with said clock adjustment signal so as to generate a reconstructed clock therefrom;
- a plurality of network ports for interfacing said edge switch to one or more communication links; and
- a packet processor comprising ingress packet processing means and egress packet processing means.

* * * * *